Aug. 19, 1947.  J. M. LEACH  2,425,945
CONFECTION-TONGUE DEPRESSOR
Filed May 2, 1946
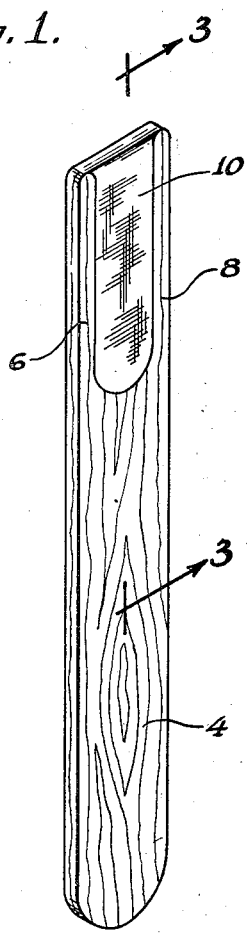
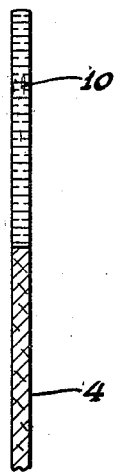
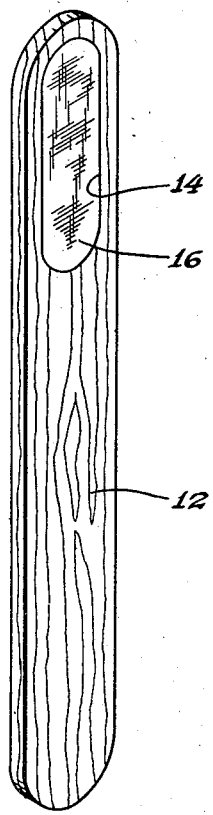
INVENTOR.
John M. Leach Patented Aug. 19, 1947

2,425,945

UNITED STATES PATENT OFFICE 2,425,945

CONFECTION TONGUE DEPRESSOR

John M. Leach, Port Washington, N. Y.

Application May 2, 1946, Serial No. 666,545

5 Claims. (Cl. 128—15)

1

The present invention relates to a combination surgical tool and confection. More particularly, it relates to a combination tongue depressor and candy confection.

One of the most difficult operations in the physical examination of small children is to depress the tongue while examining the throat. The average child through fear, apprehension and unpleasant memories of former experiences becomes excited and closes its teeth on the depressor, gags and makes the entire operation difficult for the physician and upsetting to itself.

The article of the present invention actually transforms what has previously been an unpleasant experience for a child undergoing a throat examination into a pleasant experience which facilitates the operation and leaves the child in a pleasant mood for subsequent treatment as well as causes the child to have confidence in the physician.

It is an object of the present invention to provide a throat examination instrument which causes the child to have a pleasant taste sensation while it is being used.

It is another object of the present invention to provide a combination tongue depressor and confection which creates a sweet or other desired taste in the mouth of the child while it is being used.

It is still another object of the present invention to provide a tongue depressor which will create a pleasant taste in the mouth of the child while it is being used and at the same time provide unobstructed vision for the examining physician.

It is further object of the present invention to provide a combination tongue depressor and confection in the form of a candy sucker which can be used as a reward to the child for good behavior during the examination.

Other objects and advantages of the present invention will be either pointed out in the following detailed description of what is now considered the preferred form of the invention or will be apparent to those skilled in the art.

The invention accordingly comprises the article possessing the features, properties and relation of elements which are exemplified in the following detailed disclosure and the scope of the invention will be indicated in the claims.

For a more detailed description of the invention, reference should be had to the following specification taken in connection with the drawings, throughout which like reference characters refer to like parts, and in which:

2

Fig. 1 is a perspective view of a combination tongue depressor and candy confection made in accordance with the present invention;

Fig. 2 is a modified form of the article of the invention illustrated in Fig. 1, and Fig. 3 is a fragmentary cross sectional view taken substantially on the plane indicated by line 3—3 of Fig. 1 and looking in the direction of the arrows.

The article of the present invention comprises a body member 4, illustrated in Fig. 1 as formed with furcations 6 and 8. The body member may be formed of wood, plastic, fibre board or any other desired material which is sufficiently stiff to permit the article to be used as a tongue depressor.

The space between the furcations 6 and 8 is filled with a confection which is preferably a hard sugar candy but may be any desired confection having a pleasant taste.

The form of the invention illustrated in Fig. 2 comprises a body member 12 which corresponds to the member 4 of Fig. 1, and which is provided with an opening 14 which is filled with a confection 16 corresponding to the confection 10 of Fig. 1.

In use the member 4 or the member 12 is pressed against the tongue to depress it, with the confection in contact with the tongue so as to create a pleasant taste sensation. When the examination is completed the article is given to the child who can eat the confection by licking and sucking it as in the case of a candy sucker.

The present invention makes it possible for a physician to examine the throat of a child without the customary difficulty because the pleasant taste secures the cooperation of the child, and the fact that the confection element of the article does not substantially enlarge the thickness of the body member, being substantially confined within the inner bounding surfaces of the portion of the body member which is reduced in cross sectional area, and thus does not obstruct the vision of the physician, makes the article equally as convenient for the physician as a conventional depressor. This novel combination of factors contributes to new and heretofore unobtainable results.

The invention having been described, what is claimed is:

1. A combination confection-tongue depressor comprising an elongated body member having a portion the cross sectional area of which is smaller than the cross sectional area of the remainder of the body member, and a quantity of confection substantially confined within the inner bounding surfaces of said portion of reduced area.

2. A tongue depressor comprising an elongated, flat and thin body member provided with an opening extending therethrough in the direction of the thickness of the body member, and a quantity of hard candy filling the opening and substantially confined within the inner bounding surfaces of said opening.

3. A tongue depressor comprising an elongated, flat body member provided with furcations, and a quantity of candy between the furcations and substantially confined within the inner bounding surfaces of said furcations.

4. A tongue depressor comprising an elongated, bifurcated body member, and a quantity of confection between the furcations and substantially confined within the inner bounding surfaces of said furcations.

5. A tongue depressor comprising a thin, flat body member provided with furcations at one end, and a quantity of candy between the furcations and of substantially the same thickness as the said body member.

JOHN M. LEACH.

REFERENCES CITED

The following references are of record in the file of this patent:

UNITED STATES PATENTS

| Number | Name | Date |
|---|---|---|
| 1,980,588 | Hopp | Nov. 13, 1936 |

OTHER REFERENCES

In re Thuau, 1943, C. D. 390.

Page 201 of Standard Surgical Instruments, 4th edition, published by Murray-Baumgartner Surgical Instrument Co., Baltimore, Md.